3,176,910
ROTOR AND SEAL COMBINATION FOR
ROTARY MECHANISMS
Max Bentele, Ridgewood, N.J., assignor to Curtiss-Wright
Corporation, a corporation of Delaware
Filed Nov. 20, 1962, Ser. No. 239,027
10 Claims. (Cl. 230—145)

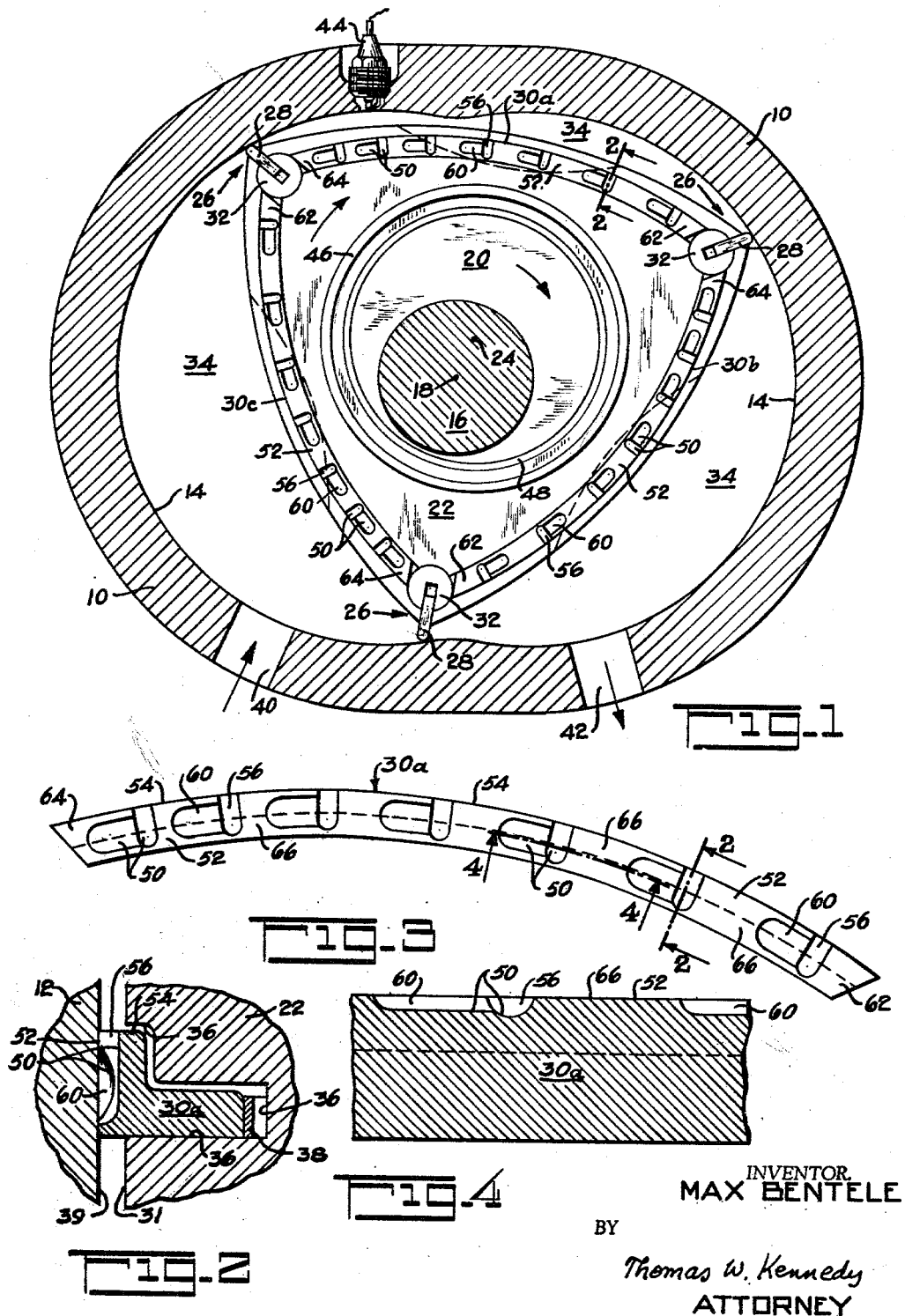

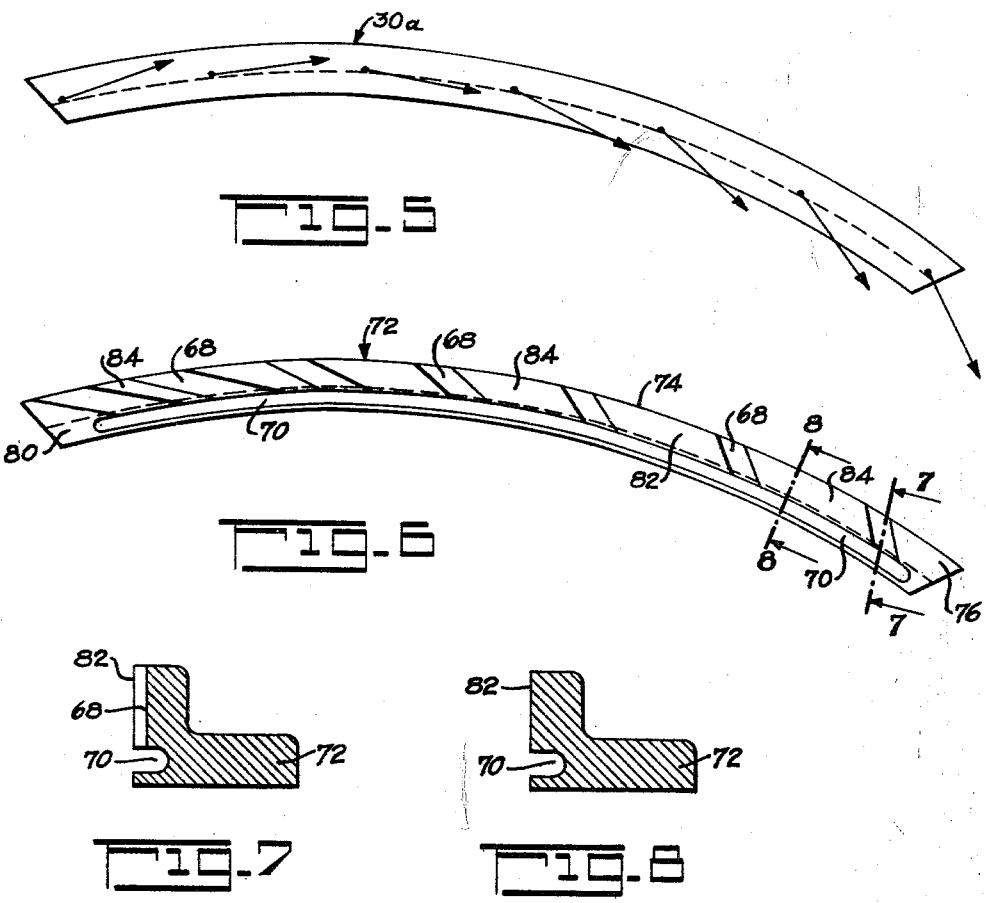

The present invention relates broadly to the art of rotary mechanisms and is particularly directed to sealing means for such rotary mechanisms.

The invention is particularly useful in connection with rotary mechanisms similar to that disclosed in United States Patent Number 2,988,065, although as will become apparent, this invention is not limited to this specific type of rotary mechanism. In the following description the invention is described in relation to an internal combustion engine, but the invention is also suited to other forms of rotary mechanisms such as fluid pumps and fluid motors.

A rotary engine as disclosed in said patent comprises an outer body or housing having a cavity therein and an inner body or rotor disposed therein rotatable relative to the outer body, about an axis laterally spaced from, but parallel to the axis of said cavity. The inner body is journaled on an eccentric portion of a shaft which is co-axial with the outer body and journaled in bearings carried by the outer body end walls. The outer body has axially-spaced end walls and a peripheral wall interconnecting the end walls to form said cavity; the inner surface of the cavity peripheral wall having a multilobed profile which preferably is basically an epitrochoid.

For proper operation, seals are provided and are arranged substantially similar to those disclosed in United States Patent Number 3,033,180. The inner body or rotor has end faces carrying end-face seal means and intermediate seal elements disposed adjacent to said outer body end walls for sealing cooperation therewith, and has a peripheral surface with a plurality of circumferentially-spaced apex portions, each carrying a radially-movable seal or seal means for sealing engagement with the multi-lobed inner surface of the outer body peripheral wall to form a plurality of working chambers between the two bodies which vary in volume upon relative rotation of the two bodies. The working chambers of the engine undergo a process of operation, which includes the four phases of intake, compression, expansion and exhaust.

Each apex seal of the inner body is received within an outwardly-facing groove running axially from one end face to the other of the inner body at its associated apex portion on the inner body thereby separating the adjacent working chambers. Between the intermediate seal elements, disposed at the rotor apex portions on each end face of the rotor adjacent to the rotor periphery, and associated with a working chamber, are end-face seal strips, each of which extends from one intermediate seal element to an adjacent element and is received in a groove in its rotor end face. Suitable spring means may be provided behind each end-face seal for helping to urge the seal strip against the adjacent end wall although the gas pressure provides the major force particularly at high chamber gas pressure. The seal strips and intermediate seal members at each rotor end face cooperate to provide a continuous contact area in sealing engagement with the adjacent end walls of the outer body, said seal contact area encircling the motor axis and being disposed adjacent to the rotor periphery whereby a seal is provided adjacent to the rotor periphery against inward flow of combustion gases between the rotor end faces and the end walls. The gas pressure within the working chambers urges each end-face seal strip radially inwardly against the radially inner face of its groove and also acts behind each end-face seal strip urging the end-face seal strip axially outwardly against the adjacent inner face of the end wall. After prolonged engine operation, frictional wear particularly over the cooperating seal surfaces of the end-face seal strip and the adjacent end wall may result, particularly in regions where the contact pressures are high as will be explained hereafter.

With the engine disclosed, each working chamber performs a four-phase process in each rotation of the rotor. Combustion occurs once in each revolution of the rotor and takes place adjacent to the same part of the peripheral and end walls of the outer body, which is adjacent to the epitrochoidal minor axis on the ignition side of the epitrochoidal major axis. The gas forces occurring in the working chambers press the end-face seal strips against their adjacent end-wall inner faces. These forces are particularly large during combustion and hence may cause greater friction wear in the combustion region of each of the end-wall inner faces. Thus, frictional wear of the end-wall inner faces may result particularly adjacent to the region where combustion occurs, which then may cause local gas leakage across the seals with resulting instability and loss in engine performance.

In prior combustion engines of this type it has been proposed to minimize such wear by hardening the end-wall inner face by the method of nitriding, chrome plating, molybdenum coating and so forth. In addition or in lieu thereof, wear of the seal surfaces of the end-wall inner faces and the rotor end-face seal strips has been minimized by special provisions for lubricating the seal surfaces as by mixing lubricating oil with the engine fuel. All of these special lubrication means result in high oil consumption.

An object of the present invention comprises the provision of a rotor for a rotary combustion engine in which a novel and simple end-face seal is provided for maintaining continuous good sealing of the working chambers and for avoiding frictional wear of the adjacent end-wall inner face and the seals, so as to minimize the need for hardening the end walls inner face or for extra lubrication of the end face seals, and to increase the useful engine life.

A further object of the invention comprises the provision of a novel end-face seal for the rotor of a rotary mechanism such that a gas film is provided between the end-face seal and the adjacent housing end wall to minimize friction therebetween.

Specifically, this invention provides recesses or grooves disposed on the end-wall-engaging edge of each rotor end-face seal strip, which provide for the formation of a gas film between the end-face seals and the adjacent end walls to thereby reduce frictional wear of the end-face seal strips and end-wall inner face.

Another object is to furnish an amount of gas lubrication of the end-face seal strips varying with the gas pressure of the adjacent working chamber.

Still another object is to minimize seal friction drag and improve engine efficiency.

An additional object is to provide more gas lubrication near the trailing-end portion of each seal strip than the leading-end portion because this trailing portion of the seal strip is more difficult to lubricate adequately when the strip is in a position at which its adjacent working chamber is undergoing combustion and specifically at the time the maximum combustion gas pressure occurs in said working chamber.

Other objects of the invention will become apparent upon reading the annexed detail description in connection with the drawings in which:

FIG. 1 is a sectional view of a rotary combustion engine, showing the end face of the rotor, embodying the invention;

FIG. 2 is a sectional view through the end-face seal strip as taken on line 2—2 of FIG. 1, or as taken on line 2—2 of FIG. 3 but with the seal strip mounted in the rotor;

FIG. 3 is an enlarged view of the upper end-face seal strip illustrated in FIG. 1;

FIG. 4 is a sectional view as taken on line 4—4 of FIG. 3;

FIG. 5 is a view similar to FIG. 3, except with the grooves deleted, and schematically illustrating by arrows the instantaneous direction of motion of selected points on an end face seal strip, when the adjacent working chamber is undergoing combustion and the pressure-therein is a maximum;

FIG. 6 is a view similar to FIG. 3, except showing an alternate form of end-face seal strip in accordance with the invention;

FIG. 7 is a sectional view as taken on line 7—7 of FIG. 6;

FIG. 8 is a sectional view as taken on line 8—8 of FIG. 6.

Referring to the drawings, the housing or outer body of a rotary combustion engine comprises spaced end walls 12 (FIG. 2) and a peripheral wall 10 (FIG. 1) disposed between and interconnecting said end walls to form a cavity therebetween. The inner surface 14 of the peripheral wall 10 preferably has a multi-lobed profile in cross-section which preferably is basically an epitrochoid.

In FIG. 1, a shaft 16, having an axis 18, which is coaxial with the axis of the outer-body cavity and along which the end walls 12 are spaced, extends through the outer body and is journaled in bearings (not shown) carried by the end walls 12. The shaft 16 has an eccentric portion 20 on which an inner body or rotor 22 is journaled, the axis of the inner body 22 and the eccentric 20 being indicated at 24.

The rotor 22 has a plurality of circumferentially-spaced apex portions 26 about its outer periphery. Each of said apex portions 26 has radially-movable apex seal means 28 received within a single outwardly-facing groove extending in a direction parallel to the rotor axis from one end face to the other of the rotor 22 and urged radially outward by spring means (not shown) into sealing engagement with the peripheral wall inner surface.

The inner body 22 also has end faces 31 having end-face seal means 30 and intermediate seal elements 32 disposed in sealing engagement with the end walls 12 which together with the apex seals 28 seal the working chambers 34 formed between the inner and outer bodies, said chambers varying in volume upon rotation of the inner body 22 relative to the stationary outer body. The bottom of each apex groove has a enlarged cylindrical bore portion at each end of the groove, and an axially-movable intermediate seal element 32 is slidably fitted within such cylindrical portion and urged axially against the adjacent end wall 12 preferably by spring means and gas pressure.

Between the intermediate seal elements 32, disposed at the rotor apex portions 26 on each end face of the rotor 22 adjacent to the rotor periphery, and associated with a working chamber 34, are end face seal strips 30, each of which extends from one intermediate seal element 32 to an adjacent element 32 and is received in a recess 36 in its rotor end face. Suitable spring means 38 may be provided behind each end-face seal for initially the seal strip against the adjacent end wall. During rotation of the inner body 22, the apex seal means 28 slide continuously along with their outer contact tip in bearing against the inner surface 14 of the peripheral wall 10, and the intermediate seal elements 32 and end face seal strips 30 slide continuously along the flat inner surfaces 39 of the end walls 12.

The outer body has intake port means 40 for supply of an intake charge to the working chambers 34 and has exhaust port means 42 for discharge of exhaust gases from the engine. If needed, a suitable spark plug 44 may be provided to ignite the intake charge. During engine operation, the inner body 22 has a planetary relation to the engine shaft 16 and suitable gearing (not shown) preferably is provided to insure such planetary motion. In addition, a seal ring 46 may be disposed in a circular groove in each end face of the rotor 22 radially outwardly of the journal bearing 48 for said rotor on the shaft eccentric 20 and radially inwardly of the end face seal strips 30. The seal rings 46 function as oil seals to minimize leakage of lubricating oil radially outwardly beyond said seal rings 46 between their associated rotor end faces and outer body end walls 12.

The seal strips 30 and intermediate seal members 32 at each rotor end face cooperate to provide a continuous contact area in sealing engagement with the adjacent end wall 12 of the outer body, said seal contact area encircling the rotor axis and being disposed adjacent to the rotor periphery whereby a seal is provided adjacent to the rotor periphery against inward flow of combustion gases between the rotor end faces and the end walls 12. The gas pressure within the working chambers 34 urges each end-face seal strip 30 radially inwardly against the radially inner face of its recess 36. The gas pressure also acts behind each end-face seal strip 30 to add to the pressure of the spring 38 against said end-face seal strip.

The engine so far described is substantially similar to the engine disclosed in the aforementioned United States Patent Number 2,988,065 and for additional description reference is made to said patent. The seal arrangement so far described is substantially similar to the seal arrangement disclosed in the aforementioned United States Patent Number 3,033,180 and reference is made to said patent.

In the prior engine, the problem of friction and wear of the end-face seal strip exists particularly when its adjacent working chamber is in the region of its top dead center position because of:

(1) High gas pressure and, thus, contact pressures;
(2) The seal paths being concentrated in a small area;
(3) The instantaneous velocity being in the seal direction.

According to the invention, as illustrated in FIGS. 1 through 4, each end-face seal strip 30 has a plurality of circumferentially-spaced groove means 50 on its axially outer face 52. A portion 56 of each groove means 50 extends to the outer edge 54 of the seal strip 30 communicating with the adjacent working chamber 34 for gas flow therein. The grooved face of each end-face seal strip 30 lies against the inner face 39 of the end wall 12 so that gas from the adjacent working chamber 34 flows into the groove means 50 from the outer edge of the seal strip. Preferably, the seal strip 30 has an arcuate profile substantially the same as the outer periphery of the rotor, as illustrated in FIG. 1, so that the portion 56 of the groove means extends to its outer convex edge 54 facing the working chamber 34. For fabrication reasons, each seal strip 30 has a profile which is an arc of a circle.

In FIG. 1, the widths of the seal strips 30, and in FIGS. 1 and 2, the widths and depths of the grooves 50, have been exaggerated for purposes of illustration. For example, in a rotor 22 having an over-all diameter of about 10 inches, the width of the seal strip 30 is about three-sixteenths of an inch. The depth of the groove 50 is about one to three-thousandths of an inch.

As illustrated in FIGS. 1 and 3, the groove means 50 has an L-shape configuration with a transverse portion 56 forming one leg of the L-shape and directed outwardly, and with a longitudinal portion 60 forming the other leg of the L-shape and running lengthwise along the strip face 52 toward the trailing end 64 of the seal strip. The transverse portion or feed groove 56 extends to the radially outer edge 54 of the seal strip 30 communicating with the working chamber 34 where gas flow enters the groove means 50 from the adjacent working chamber. Preferably, the cross-sectional area of the transverse portion 56, that is the area measured by the groove depth and width, is greater than the cross-sectional area of the longitudinal portion 60. After the gas passes through the transverse or feed portion 56 and enters the longitudinal portion 60, it flows toward the blind end of the longitudinal portion away from the transverse portion 56, and is compressed to higher pressure in portion 60 owing to the ramming effect of rotor rotation.

As shown in FIG. 2, each end-face seal strip 30 is received in a recess 36 in the rotor end face 31 and is urged against the inner face 39 of the adjacent end wall 12 by spring means 38. Gas from the working chamber 34 enters the rotor recess 36 through the gap between the radially outer face of the seal strip 30 and the adjacent side wall of the rotor recess 36. The gas pressure also urges the seal strip 30 against the radially inner side wall of the rotor recess 36. Gas enters the gas-lubrication grooves 50 in the axially outer face 52 of the seal strip 30 and the gas pressure thereon relieves the bearing pressure of the seal strip face 52 against the end wall 12.

At low sliding speed, the gas pressure in the gas lubrication grooves 50 on the axially outer face of the seal strip 30 is slightly lower than in its adjacent chamber 34, and the gas pressure in the strip recess 36 is lower than in said chamber 34 but acts on the full area of the axially inner face. Thus, the gas pressure in the grooves 50 provides a hydrostatic or bearing effect on the seal strip 30 which reduces contact pressure and friction wear.

With increasing sliding speed, the gas pressure in the grooves 50 rises due to hydrodynamic effects, giving a transition from boundary to hydrodynamic lubrication. The seal strip 30 is lifted away from the end wall 12 so that there is no longer a metal-to-metal contact. Since there is practically no friction at such higher speed, the friction wear of the seal strip 30 and its adjacent end wall surface is greatly reduced.

There will be some gas leakage past the seals 30 after such lift during engine operation. The amount of lift of the seal strip 30 depends on the geometry of the longitudinal groove portion 60 and the feed groove 56, and also, on the sliding velocity and the viscosity of the gas, the latter depending respectively on the engine speed and load. For example, at constant load, the lift and leakage would vary with engine speed. At constant speed, the lift and leakage would vary with engine load. With proper groove designs, the lift amounts to a fraction of a thousandth of an inch as a maximum. Thus, the slight detrimental effect of the leakage would be consistent with the general performance requirements of the engine.

In each revolution of the rotor, each end-face seal strip 30 is subject to the changes in gas pressure as its adjacent working chamber 34 passes through a four-phase process. However, the gas pressure behind the end-face seal strip 30 is opposed by the gas pressure in the gas lubrication grooves 50 against its axially-outer face 52. The gas pressures in the transverse groove portion 56 and the strip recess 36 are proportionate to the gas pressure in the chamber 34. The gas pressure in the groove means 50, in addition, depends on the strip speed, with which it rises, owing to ramming compression. Thus, at high speed, there is more leakage, but it occurs in less time, so that the total leakage is less. Further, the strip 30 can operate properly through its four-phase process in each rotor revolution regardless of changing pressure because the differential pressure is small at all speeds.

In FIG. 1, the rotor 22 is shown in a position just after one of its working chambers 34 (the upper chamber illustrated in FIG. 1) passes top dead center position. This is approximately the position of the rotor 22 when the gas pressures in said chamber reach their peak value. At this rotor position, the end-face seal strip adjacent to the upper chamber 34 undergoing combustion is pressed against the adjacent surface of the outer-body end wall 12 with the highest pressure, when using the prior-art form of seal strip, since maximum pressures occur in each working chamber during its combustion phase when it is positioned in the region of its top dead center position and shortly thereafter.

In addition, because of its planetary motion with its rotor 22, the path of travel of an end face seal strip 30 when in the position of the upper strip 30a in FIG. 1 is such that the trailing portion 64 of the strip is moving in a direction which is substantially parallel to its longitudinal dimension of the strip while its leading portion 62 has a substantial sidewise or radially inward direction of motion. This motion of a seal strip 30 when in the position of the upper strip 30a in FIG. 1 is indicated by the arrows at selective points along the strip 30a illustrated in FIG. 5 only in outline form. Because of this travel path of each end face seal strip 30, when the pressure in a working chamber is a maximum and therefore when the contact pressure of the adjacent end face seal 30a against the adjacent end wall is a maximum, the trailing end portion 64 of the seal 30a is substantially more difficult to lubricate than its leading end portion 62. As a result, the seal wear of its outer body end walls is a maximum in the region traversed by the trailing end portion of each end face seal when the adjacent working chamber is in the region of its top dead center position.

The region of maximum wear is located approximately under the trailing end 64 of the upper end-face seal strip 30a as illustrated in FIG. 1 adjacent to the region of the peripheral-wall inner surface 14 which is on the side of the waist portion of the epitrochoidal profile toward the intake port 40. This wear, when excessive, results in a wear path, the borders of which are defined by two small steps.

If the area of the end wall 12 contacted by the seal strip 30 and encircling the rotor axis 24, that is the path of the seal strip 30, is worn away a uniform amount, there is less likelihood of leakage past the seal strip 30, than if the path of the seal strip 30 is worn away to a severe extent on one part of the path and only slightly on the remainder of the path. Thus, a region of greater wear in one part of the path of the seal strip 30 may cause excessive local leakage. Therefore, it is desirable to provide greater lubrication of the end-face seals in the region where seal wear on the end walls would otherwise be a maximum. The arrangement and layout of the grooves 50 on the axially outer faces 52 of the rotor end-face seal strip 30 as illustrated in FIGS. 1 and 3 provide such a desirable distribution of gas lubrication.

As illustrated, the longitudinal groove portions 60 are of equal length, but the lands 66 between the longitudinal portions 60 and the lands 66 between the transverse portions 56 of the grooves 50 are longer at the leading end 62 of the strip 30 than the trailing end 64, so that the grooves 50 are spaced closer together and provide more gas lubrication at the trailing end 64. This arrangement thereby minimizes seal wear in the region where maximum end-face seal wear has been previously experienced as hereinabove described.

In FIG. 6, an alternate type of end-face seal strip 72 having another type of groove configuration with a spiral or inclined orientation is illustrated. Each said seal strip 72 has a continuous longitudinal recess 70 connecting to a plurality of inclined grooves 68. The angles of inclination of the spiral or inclined grooves 68 with respect to a normal to the outer edge 74 of the seal strip 72 are preferably smaller at the leading end 76 of the seal strip 72 than at its trailing end 80 because of the greater sideward travel of the leading end 76 when the adjacent working chamber is at its peak combustion pressure condition.

As illustrated each groove 68 is inclined relative to a normal to the strip outer edge so that its open outer end is directed rearwardly relative to the direction of motion of its end face seal. Gas enters the rearward leaning end of each inclined groove 68 at the strip outer edge 74 and the action of the gas therein provides similar hydrostatic and hydrodynamic effects as in the L-shaped groove. At low sliding velocity of the seal strip 72, the gas pressure in the groove 68 increases sufficiently to give a hydrostatic bearing effect under the seal strip 72. At high velocity, lift of the seal strip 72 is caused by an increased gas pressure, and the lift is maintained by the gas film formed over the grooves 68 and lands between the axial outer face 82 of the seal strip and the inner surface 39 of the end wall 12.

The inclined or spiral-type groove 68 acts most effectively when the groove axis, that is an approximate line running midway between the groove side walls, is disposed at preferably a 14° angle, or in a range of 10° to 25°, to the direction of movement of the groove 68 and its adjacent portion of the seal strip 72. The axis of each groove 68, in FIG. 6, is about a 14° preferred angle measured clockwise relative to the direction of travel of the groove 68 and its adjacent portion of the seal strip 72 when the adjacent working chamber is in the peak combustion pressure condition. The angle of inclination of the grooves 68 at the leading end 76 of the seal strip 72 are at a smaller angle relative to their normal to the strip outer edge than at the trailing end 80 because the leading end 76 of the seal strip 72 at the moment of said peak pressure has a larger sideward movement or broadside aspect than does the trailing end 80 of the seal strip 72. Thus, at the moment of said peak pressure each spiral groove 68 in the adjacent apex seal has substantially the same angular deviation, preferably a 14° angle, to the direction of its movement or to its velocity vector. Thus, each spiral groove 68 acts most effectively when its end-face seal is in the position when gas lubrication is most needed.

The lands 84 betweens the spiral grooves 68, as illustrated in FIG. 6, are shorter at the trailing end 80 than the leading end 76 of the seal strip 72, and the groove widths are preferably equal, in order to provide more gas lubrication at the trailing end 80 of the seal strip 72 where the friction wear is most severe for the position of the seal strip next to the working chamber 34 in the combustion phase.

The seal strip 72 preferably has, in addition, on its outer face 82 a continuous longitudinal recess 70 communicating with the inner ends of each spiral groove 68 in order to better distribute the flow of gas into all of the spiral grooves 68 on the seal strip to assure that all said grooves contribute to the gas lubrication of the outer face of the seal strip.

The various improvements of the invention avoid special hardening of the inner surfaces of the end walls; minimize the supply of oil required for lubrication of the end-face seal strips; provide an automatic gas lubrication of the end-face seal strips; minimize friction and wear and provide an improved wear pattern on the inner surfaces of the end walls; minimize any increase in gas leakage after prolonged engine operation; and increase the life of the engine.

While I have described my invention in detail in its present preferred embodiment it will be obvious to those skilled in the art after understanding my invention that various changes and modifications may be made therein without departing from the spirit or scope thereof. It is intended by the appended claims to cover all such modifications.

What is claimed is:

1. A rotor and seal combination for use in a rotary mechanism having an outer body comprising a peripheral housing having a longitudinal axis and a pair of end walls spaced along said axis and forming a cavity within which said rotor and seal combination is received, said rotor being rotatable relative to said outer body about an axis displaced from and parallel to said outer body axis, said rotor axis planetating about said outer body axis to form a plurality of variable-volume working chambers between said rotor and said outer body wherein high gas pressures cyclically occur; said rotor and seal combination comprising a rotor having parallel end faces respectively disposed adjacent to said end walls and parallel therewith, said rotor having a plurality of apex portions sweeping the inner surface of said peripheral wall in sealing relation thereto, at least one of said end faces having a seal groove therein adjacent to the periphery of said rotor and generally parallel thereto and extending between each pair of adjacent apex portions, and a seal strip member disposed in each of said seal grooves, each of said seal strip members having an axially outward plane sealing face sweeping one of said end walls in sealing relation thereto during rotation of said rotor, each of said sealing faces having a radially outward edge and a radially inward edge as positioned by said rotor, each of said sealing faces having therein a plurality of gas-lubrication recesses communicating with said working chambers at said radially outward edge of said sealing face and closed at said radially inward edge whereby said high-pressure gas cyclically enters said recesses to provide gas-lubrication between said seal strip and said end wall.

2. A rotor and seal combination as recited in claim 1, wherein said gas-lubrication recesses intercommunicate.

3. A rotor and seal combination as recited in claim 1, wherein each of said seal strip members as positioned by said rotor has a leading end and a trailing end in the direction of rotor rotation, and wherein said plurality of gas-lubrication recesses are spaced closer together toward said trailing end than toward said leading end to provide more gas lubrication toward said trailing end.

4. A rotor and seal combination as recited in claim 3, wherein each of said gas-lubrication recesses has a generally longitudinally extending portion closed toward said trailing end, and a generally transverse portion extending from the leading end of said longitudinal portion to said radially outward edge whereby during rotor rotation gas is trapped in said longitudinal portion and compressed toward said trailing closed end.

5. A rotor and seal combination as recited in claim 4, wherein said transverse recess portions have a larger cross section than the cross section of said longitudinal recess portions to provide ample gas for compression in said longitudinal portions.

6. A rotor and seal combination as recited in claim 1, wherein each of said seal strip members as positioned by said rotor has a leading end and a trailing end in the direction of rotor rotation, and wherein said gas-lubrication recesses comprise a plurality of channels communicating with said working chambers and extending in a direction generally transversely from said radially outward edge of said sealing face toward said radially inward edge, and a longitudinal channel in said sealing face disposed adjacent to said radially inward edge and interconnecting the radially inner ends of said generally transverse channels, and in which said generally transverse channels are spaced closer together toward said trailing end than toward said leading end to provide more gas lubrication toward said trailing end.

7. A rotor and seal combination as recited in claim 6, wherein said generally transverse channels are angularly inclined across said sealing face from their openings at the radially outer edge in a direction toward the leading end of said seal strip member, and wherein said angular inclination is greater at the trailing end of said seal strip member than at the leading end thereof.

8. A movable gas-lubrication seal member for sealing a moving plenum of high gas pressure from a plenum of lower pressure, comprising an elongate seal strip of arcuate outline having a leading end and a trailing end, said strip having a plane sealing surface extending between said ends adapted for sliding sealing contact in a direction generally longitudinal of said strip, said sealing surface being defined by said ends and by a high pressure edge along the convex portion of said arcuate outline and by a low pressure edge along the concave portion of said outline, said sealing surface having formed therein a plurality of gas-lubrication recesses communicating with said high pressure edge and occluded from said low pressure edge.

9. A movable gas-lubrication seal member as recited in claim 8, wherein said gas-lubrication recesses comprise a plurality of longitudinally spaced recess portions each extending in a generally longitudinal direction, each of said longitudinal recess portions being closed toward said trailing end and having a generally transverse recess portion extending from the leading end of said longitudinal portion to said high pressure edge, said transverse portions having a larger cross-section than said longitudinal portions, and said gas-lubrication recesses being spaced progressively farther apart from said trailing end of said strip toward said leading end of said strip.

10. A movable gas-lubrication seal member as recited in claim 8, wherein said gas-lubrication recesses comprise a plurality of generally transverse portions extending from said high pressure edge in a direction toward said low pressure edge and angled toward said leading end, the angular inclination of said generally transverse portions being greater at the trailing end of said seal strip than at the leading end, and a longitudinal channel in said sealing face disposed adjacent to said low pressure edge and interconnecting the ends of said generally transverse portions opposite to said high pressure edge, said transverse portions being spaced progressively farther apart from said trailing end of said strip toward said leading end of said strip.

References Cited by the Examiner
UNITED STATES PATENTS

| | | | |
|---|---|---|---|
| 1,365,348 | 1/21 | Shatler | 277—215 |
| 2,402,033 | 6/46 | Flinn | 277—96 |
| 2,925,290 | 2/60 | Greenwald | 277—3 |
| 3,033,180 | 5/62 | Bentele | 123—8 |
| 3,081,745 | 3/63 | Hurley | 277—81 |
| 3,109,658 | 11/63 | Barrett et al. | 277—96 |

LAURENCE V. EFNER, *Primary Examiner.*

SAMUEL ROTHBERG, *Examiner.*